US007042849B2

(12) United States Patent
Sakai

(10) Patent No.: US 7,042,849 B2
(45) Date of Patent: May 9, 2006

(54) METHOD AND DEVICE FOR CONTROLLING DATA TRANSMISSION

(75) Inventor: Yasushi Sakai, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 833 days.

(21) Appl. No.: 09/811,587

(22) Filed: Mar. 20, 2001

(65) Prior Publication Data

US 2001/0048668 A1 Dec. 6, 2001

(30) Foreign Application Priority Data

May 23, 2000 (JP) ............................. 2000-151160

(51) Int. Cl.
*H04L 12/28* (2006.01)
(52) U.S. Cl. ...................................... 370/254; 370/389
(58) Field of Classification Search ................ 370/254, 370/255, 256, 389, 392, 401, 408
See application file for complete search history.

(56) References Cited

U.S. PATENT DOCUMENTS

| 5,425,021 | A | * | 6/1995 | Derby et al. ................. 370/408 |
| 5,436,617 | A | * | 7/1995 | Adams et al. ............... 370/254 |
| 5,687,319 | A | * | 11/1997 | Cook et al. .................. 370/256 |
| 5,940,392 | A | * | 8/1999 | Lo et al. ...................... 370/392 |
| 6,731,596 | B1 | * | 5/2004 | Chiang et al. ............... 370/217 |

* cited by examiner

*Primary Examiner*—Ricky Q. Ngo
*Assistant Examiner*—Christine Ng
(74) *Attorney, Agent, or Firm*—Arent Fox PLLC

(57) ABSTRACT

A method for controlling data transmission in a network system configured by a first node, a second node, and a third node. The first node has a first port connected to the second node and a second port connected to the third node. The first node enables data received by the first port from the second node to be transmitted by the second port to the third node. The received data includes information of the node to which the received data is addressed. The method compares the information of the first node with the address information included in the received data, temporarily disconnects the third node from the first node when the received data is not addressed to the third node.

14 Claims, 4 Drawing Sheets

METHOD AND DEVICE FOR CONTROLLING DATA TRANSMISSION

BACKGROUND OF THE INVENTION

The present invention relates to a method and device for controlling data transmission.

Personal computers and peripheral equipment, such as a digital video camera and a color printer, are provided with serial interfaces that comply with the IEEE 1394 standard. Data transmitted in a network system includes information of the nodes transmitting and receiving the data. Every node in the network system is provided with a repeat-transmit function, which transfers the received data. Each node is also provided with a feed function for providing the received data to a device having a higher rank than the interface (e.g., CPU) in the same node when the received data is addressed to that node. The repeat-transmit and feed functions transmit data to every device in the network system. Further, the repeat-transmit and feed functions further transmit data between certain devices.

When data is transmitted between two nodes, the data (first data) is transmitted to every node connected to the network system, even if the two nodes are located adjacent to each other. Therefore, nodes irrelevant to the data transmission between the two nodes (nodes excluding the transmitting node, the receiving node, and intermediate nodes located between the transmitting and receiving nodes) are not allowed to transmit data (second data) until the data transmission between the two nodes is completed. In this case, a request for transmitting the second data is generated again after the transmission of the first data is completed.

Nodes and lines configure a network topology, or a network system. In the prior art, data packets, which are transmitted between certain nodes, occupy the network system. Thus, as the number of data packets transmitted at the same time increases, the amount of data that can be transferred during a certain period decreases. This decrease the transfer efficiency, or the virtual transfer speed, of the data packets.

SUMMARY OF THE INVENTION

It is an object of the present invention to provide a data transmission method that increases data transmission efficiency.

To achieve the above object, the present invention provides a method for controlling data transmission in a network system configured by a plurality of nodes including a first node, a second node, and a third node. The first node has a plurality of ports including a first port connected to the second node and a second port connected to the third node. The first node enables data received by the first port from the second node to be transmitted by the second port to the third node. Each node has address information. The received data includes the address information of the node to which the received data is addressed. The method includes comparing the address information of the first node with the address information included in the received data, temporarily disconnecting the third node from the first node when the received data is not addressed to the third node.

The present invention further provides a data transmission controller having a plurality of ports including a first port connected to a first node and a second port connected to a second node. A network information memory stores node information of the first and second nodes. A packet determiner is connected to the first and second ports and the network information memory for determining with the node information an addressee of data received by the first port from the first node. An interface control circuit is connected to the packet determiner to temporarily disconnect the second node from the second port when the data is not addressed to the second node.

The present invention also provides a data transmission controller incorporated in a first node for enabling data received by a first port from a second node to be transmitted by a second port to a third node. The data includes packet information containing a data origination address and a data destination address. The data transmission controller includes a first interface connected to the first port and a second interface connected to the second port. A network information memory stores first address information of the first node, second address information of the second node, and third address information of the third node. A packet determiner is connected to the first and second interfaces for comparing the data destination address with the second and third address information to determine an addressee of the received data. An interface control circuit is connected to the first and second interfaces, the packet determiner, and the network information memory for controlling the first and second interfaces. The interface control circuit processes the data when the data is addressed to the first node, transmits the data to the third node from the second port when the data is addressed to the third node. The interface control circuit controls the second interface when the data is not addressed to the third node to idle the second port and disconnect the second port from the third node to stop data transmission by the second port to the third node.

The present invention further provides a method for controlling data transmission in a network system configured by a plurality of nodes including a first node, a second node, and a third node. The first node has a plurality of ports including a first port connected to the second node and a second port connected to the third node. The first node enables data received by the first port by the second node to be transmitted from the second port to the third node. Each node has address information. The received data includes the address information of the node to which the received data is addressed. The method includes comparing the address information of the first node with the address information included in the received data, temporarily disconnecting the third node from the second port when the received data is not addressed to the third node to divide the network system into a first sub-network system including the third node and a second sub-network system including the first and second nodes, and permitting data transmission within the first sub-network system.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

A data transmission controller 11 according to a preferred embodiment of the present invention will now be described with reference to FIGS. 1 to 5.

Figure 1:
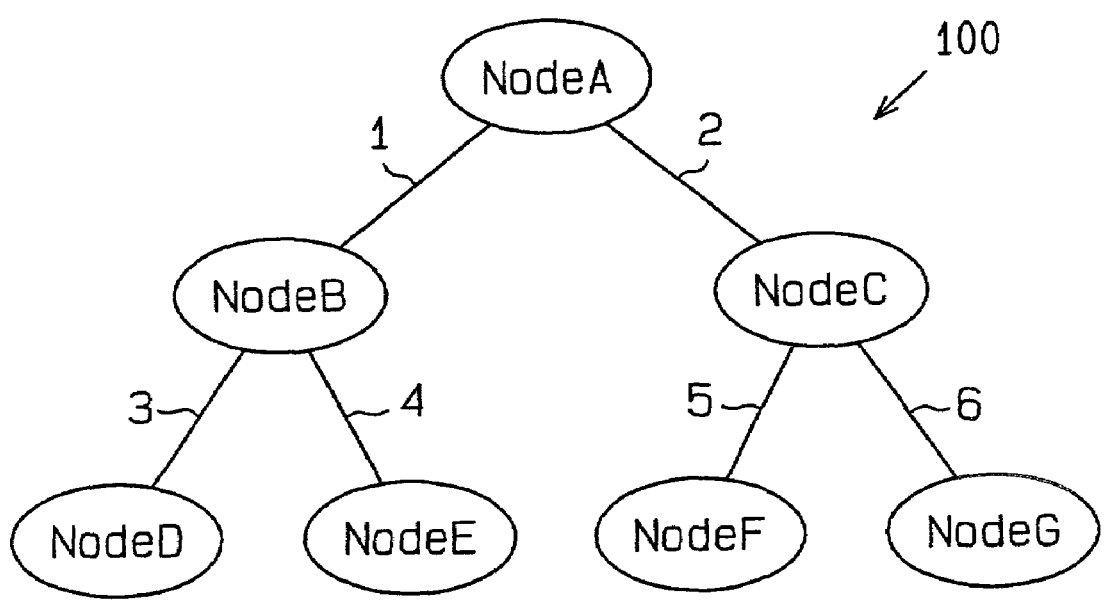
FIG. 1 is a schematic diagram of a network system.

FIG. 1 illustrates a network system 100. A plurality (seven in the illustrated embodiment) of nodes A, B, C, D, E, F, G are connected in a tree-like manner to form the topology of the network system 100. However, the network system 100 is not limited to such tree-like topology and may be configured in any manner.

A bus cable 1 connects node A and node B. A bus cable 2 connects node A and node C. A bus cable 3 connects node B and node D. A bus cable 4 connects node B and node E. A bus cable 5 connects node C and node F. A bus cable 6 connects node C and node G.

Figure 2:
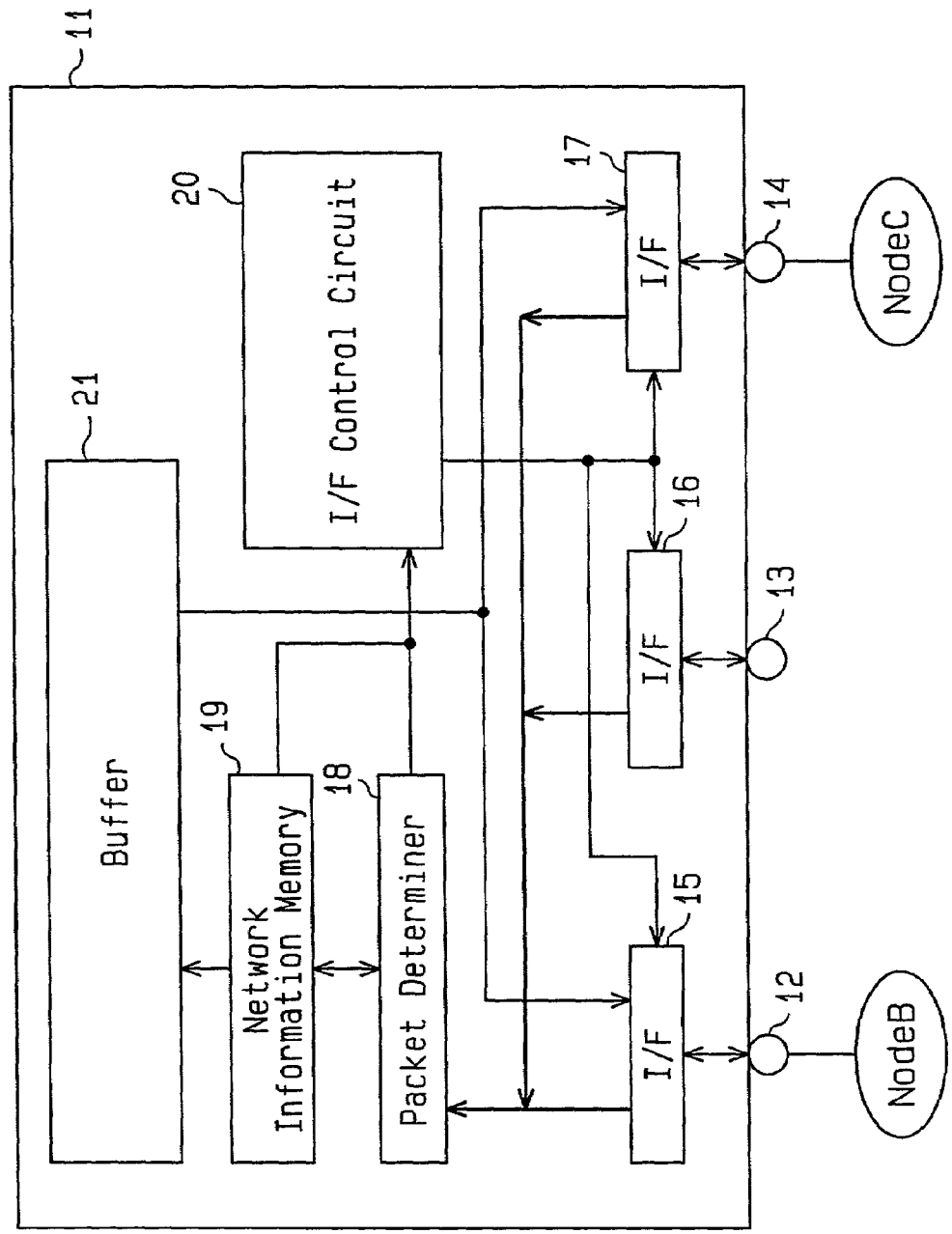
FIG. 2 is a block circuit diagram of a data transmission controller according to a preferred embodiment of the present invention.

Referring to FIG. 2, node A includes a data transmission controller 11. Each of the other nodes B–G incorporates a data transmission controller that is identical to the data transmission controller 11.

The data transmission controller 11 has a first port 12, a second port 13, a third port 14, a first interface 15, a second interface 16, a third interface 17, an interface control circuit 20, a packet determiner 18, a network information memory 19, and a buffer 21. The first to third interfaces 15–17 are connected to the first to third ports 12–14, respectively. The interface control circuit 20 is connected to the first to third interfaces 15–17. The packet determiner 18 is connected to the first to third interfaces 15–17 and the interface control circuit 20. The network information memory 19 is connected to the packet determiner 18 and the interface control circuit 20. The buffer 21 is connected to the first to third interfaces 15–17 and the network information memory 19.

The first to third ports 12–14 are connected to at least one node. For example, the first port 12 is connected to node B, and the third port 14 is connected to node C.

The data transmitted from other nodes is received by the ports 12–14 associated with those nodes. The associated interfaces 15–17 convert the electric signals of the data to logic signals (codes) and provide code data to the packet determiner 18.

The packet determiner 18 determines the addressee of the input data based on head information of the code data and node address information, which is stored in the network information memory 19. The head information includes the address of the data origination node and the address of the data destination node. The node address information includes the addresses of every node configuring a node group connected to, for example, each of the ports 12–14. A group of nodes is formed between each of the first to third ports 12–14 and the respective terminal (branch) nodes D, E, F, G. For example, a first node group formed by nodes B, D, and E is connected to the first port 12, and a second node group formed by nodes C, F, and G is connected to the third port 14.

The node address information refers to physical node numbers assigned to nodes A–G during bus reset. The physical node number, or the data origination address, is included in the head of an ID packet transmitted from nodes A–G. The network information memory 19 stores the data origination addresses of the ID packets in association with the ports 12–14.

When the network system 100 is configured, the physical node numbers of each node in the node groups connected to the ports 12–14 are automatically stored in the network information memory 19 at sections allocated for each port 12–14. Thus, in the network system 100, which allows for topology changes, the information of nodes A–G is easily collected and stored in the network information memory 19.

The packet determiner 18 determines whether the input data is addressed to its associated node (node A). When doing so, the packet determiner 18 uses the data origination address and the data destination address, which are included in the header of the input data. More specifically, the packet determiner 18 determines whether the data destination address matches the node address of node A. If the input data is addressed to node A, the packet determiner 18 provides the input data to the buffer 21. The data of the buffer 21 is provided to an upper rank device (not shown), such as a CPU. The packet determiner 18 notifies the interface control circuit 20 of its determination result.

Further, the packet determiner 18 determines whether the input data is addressed to a node connected downstream to node A (downstream node). The packet determiner 18 notifies the interface control circuit 20 of its determination result. The downstream node refers to every node in the node groups connected to the ports excluding the port that received the input data. For example, if the input data is received through the first port 12, the downstream nodes refer to the node groups connected to the second and third ports 13, 14. If the input data is received through the second port 13, the downstream nodes refer to the node groups connected to the first and third ports 12, 14. More specifically, referring to FIG. 1, if node A receives data from node B, nodes C, F, and G correspond to the downstream nodes of node A. If node A receives data from node C, nodes B, D, and E correspond to the downstream nodes of node A.

The interface control circuit 20 controls the first to third interfaces 15–17 based on the determination result of the packet determiner 18. More specifically, if the input data is addressed to a node that is downstream to node A, the interface control circuit 20 controls the first to third interfaces 15–17 to repeat-transmit the input data. If the addressee of the input data is node A or a node that is not a downstream node, the interface control circuit 20 controls the first to third interfaces 15–17 to stop repeat-transmit and temporarily disconnect node A from the downstream nodes. In the preferred embodiment, the interface control circuit 20 controls the interfaces 15–17 associated with ports other than the port receiving data to idle the ports that are not associated with the received data. This stops the flow of data to nodes that are downstream to node A. Further, the interface control circuit 20 permits the transmission of data within the node groups connected to the idle ports. This enables data transmission between nodes that are not related to the data transmission between node A and the addressee node.

Accordingly, the interface control circuit 20 configures a sub-network system formed by a plurality of node groups connected to the ports 12–14. In other words, with reference to FIG. 5, the interface control circuit 20 divides the network systems 100 into a sub-network system 110 and a sub-network system 120. The configuration of the sub-network systems 110, 120 enables the transmission of a large amount of data at the same time. This improves data transmission efficiency.

The interface control circuit 20 detects whether data transmission has been completed in every sub-network system. The completion of data transmission is detected when the data transmitted in every sub-network system is returned to each port 12–14 by repeat-transmit. Upon confirmation of completion of data transmission in every sub-network system, the interface control circuit 20 idles all of the first to third ports 12–14. This returns the sub-network systems to the original single network system 100.

Figure 3:
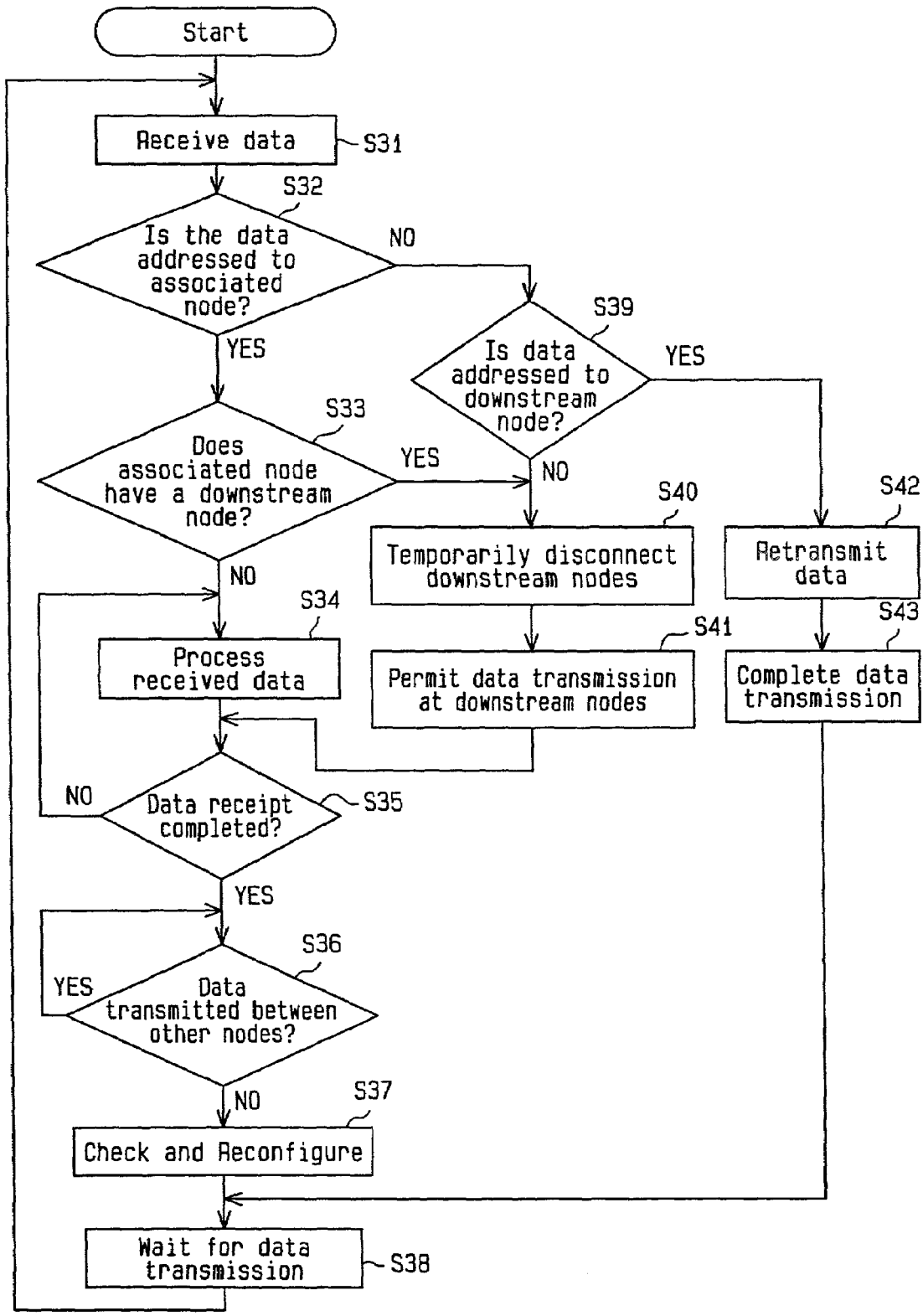
FIG. 3 is a flowchart of a data transmission control routine performed by the data transmission controller of FIG. 2.

FIG. 3 is a flowchart illustrating a control routine performed by the data transmission controller 11. In the routine, the network system 100 is divided into sub-network systems and reconfigured in accordance with steps S31 to S43.

At step S31, the data transmission controller 11 receives data. At step S32, the data transmission controller 11 determines whether the received data is addressed to its associated node (node A). If the received data is addressed to its node, the data transmission controller 11 proceeds to step S33 and determines whether its associated node has a downstream node. If there are no downstream nodes, the data transmission controller 11 proceeds to step S34 and processes the data received by the associated node. At step S35, the data transmission controller 11 determines whether the receipt of the data has been completed. In other words, the data transmission controller 11 continues to process the received data in step S35 until the receipt of the data addressed to its associated node is completed. If the receipt of data is completed, the data transmission controller 11 proceeds to step S36 and determines whether data is being transferred between the other nodes. In step S37, the data transmission controller 11 checks the network configuration. When the network has been disconnected, the data transmission controller 11 reconfigures the network. Afterward, at step S38, the data transmission controller 11 waits until the next data transmission.

If the data transmission controller 11 determines that the received data is not addressed to the associated node, the data transmission controller 11 determines whether the received data is addressed to a downstream node. If the data is not addressed to a downstream node, the data transmission controller 11 proceeds to step S40 and temporarily disconnects the associated node from the downstream nodes. The data transmission controller 11 also temporarily disconnects the associated node from the downstream nodes in step S40 when determining that the associated node has a downstream node in step S33. At step S41, the data transmission controller 11 permits the transmission of data at the downstream nodes. Then, at steps S35 and S36, the data transmission controller 11 waits until completion of the transmission of data in the network system, which includes the associated node. Afterward, at step S37, the data transmission controller 11 connects the associated node to the downstream nodes and returns the network system 100 to its original state.

If the data transmission controller 11 determines that the received data is addressed to a downstream node in step S39, the data transmission controller 11 proceeds to step S42 and retransmits the received data to the downstream nodes. At step S43, the data transmission controller 11 waits until the completion of the transmission of data, which is routed through the associated node. Then, at step S38, the data transmission controller 11 waits until the next data transmission.

Figure 4:
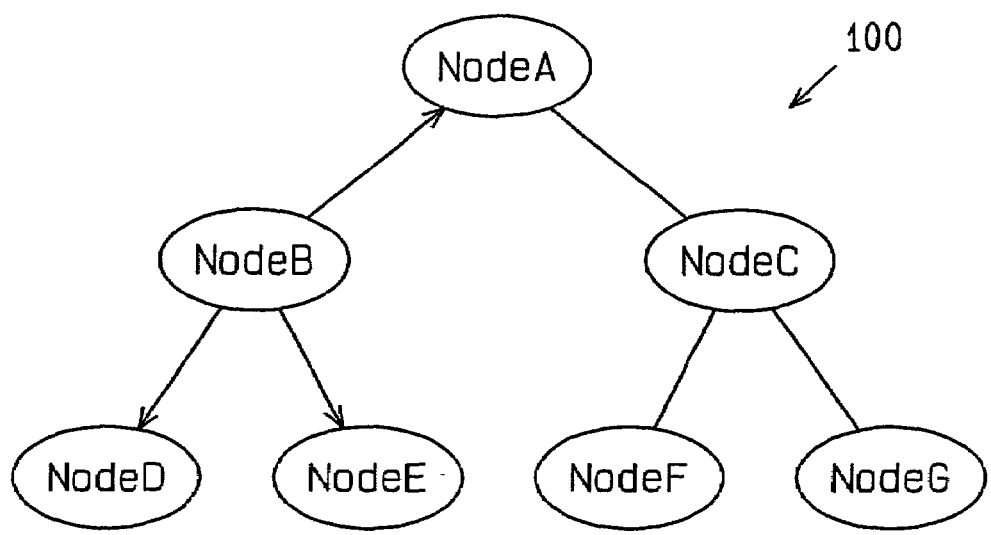
FIG. 4 is an explanatory diagram illustrating the flow of data in the present invention.

An example of the data transmission control will now be described with reference to FIGS. 4 and 5.

In the example, data is transmitted from node B to D. With reference to FIG. 4, node B transmits data to nodes A, D, and E. The data is provided to the first port 12 of node A. Node A analyzes the input data. Since the input data is not addressed to node A or a downstream node of node A, node A does not retransmit the input data to the downstream nodes.

Figure 5:
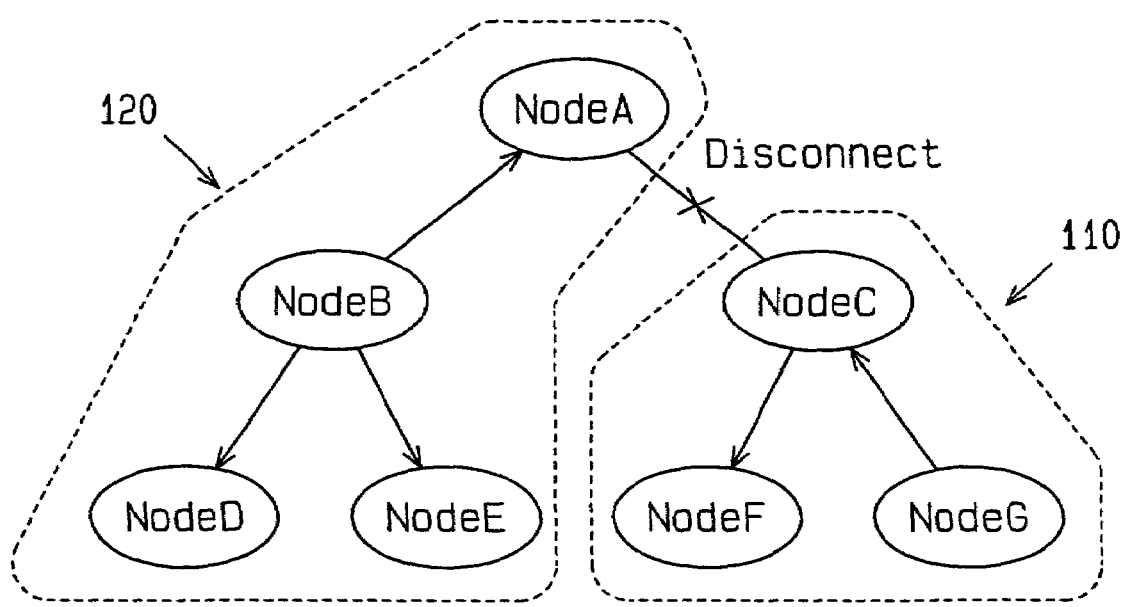
FIG. 5 is an explanatory diagram illustrating the flow of data in the present invention.

Then, referring to FIG. 5, node A idles the third port 14, which is not connected to node B, and temporarily disconnects downstream nodes C, F, and G from node A. This divides the network system 100 into the first sub-network system 110, which is formed by nodes C, F, and G, and the second sub-network system 120, which is formed by nodes A, B, D, and E. Node A permits data transmission within the first sub-network system 110, that is, between nodes C, F, and G. Hence, node G starts the transmission of new data to node F. Accordingly, data is simultaneously transmitted between nodes B and D and between nodes G and F.

The preferred and illustrated embodiment has the advantages described below.

(1) When the data transmission controller 11 receives data that need not be transmitted to downstream nodes, the data transmission controller 11 idles the ports that have not received the data. This divides the network system 100 into the sub-network systems 110, 120. Since the transmission of data is permitted in each of the sub-network systems 110, 120, a large amount of data is simultaneously transmitted. This improves the data transmission efficiency.

(2) When the transmission of data is completed in each of the sub-network systems 110, 120, the data transmission controller 11 idles all of the ports 12–14. This connects the downstream nodes, which were disconnected from the node associated with the data transmission controller 11, to the associated node and reconfigures the original network system 100. Accordingly, the network system 100, returned to its original configuration, is enabled to transmit data between its nodes.

Although the present invention is embodied in the data transmission controller 11, which complies with the IEEE 1394 standard, the present invention may be embodied in any device that enables data transmission between nodes of a network system.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A method for controlling data transmission in a network system configured by a plurality of nodes including a first node, a second node, and a third node, wherein the first node has a plurality of ports including a first port connected to the second node and a second port connected to the third node, and wherein each node has address information, the method comprising the steps of:

when the first node receives data, the received data including the address information of the node to which the received data is addressed, comparing at the first node the address information stored in the first node with the address information included in the received data;

temporarily disconnecting the third node from the first node to form a first sub-network system, which includes the third node and does not include the first node, and a second sub-network system, which includes the first node, when the received data is not addressed to a downstream node including the third node; and permitting data transmission within each of the sub-network systems.

2. The method according to claim 1, wherein the temporarily disconnecting includes dividing the network system into a plurality of sub-network systems; including the first and second sub-network systems.

3. The method according to claim 1, wherein the disconnecting step includes idling the second port.

4. The method according to claim 1, further comprising the steps of:

monitoring data transmission at each port; and idling all of the ports when data transmission is completed at all of the ports.

5. The method according to claim 1, wherein the first node takes the received data when the received data is addressed to the first node.

6. A data transmission controller comprising:

a plurality of ports including a first port connected to a first node and a second port connected to a second node;

a network information memory for storing node information of the first and second nodes;

a packet determiner connected to the first and second ports and the network information memory for determining with the node information an addressee of data received by the first port from the first node; and an interface control circuit connected to the packet determiner to temporarily disconnect the second node from the second port to form a first sub-network system, which includes the second node and does not include the data transmission controller, and a second sub-network system, which includes the data transmission controller, when the data is not addressed to a downstream node including the second node, the interface control circuit permitting independent data transmission within each of the sub-network systems.

7. The data transmission controller according to claim 6, further comprising a plurality of interfaces respectively connected between the ports and the interface control circuit, wherein the interface control circuit controls the interface associated with the second port to idle the second port and temporarily terminates the connection between the second port and the second node.

8. The data transmission controller according to claim 6, wherein the interface control circuit monitors data transmission at the ports and idles all of the ports after data transmission is completed at all of the ports.

9. A data transmission controller comprising:

a plurality of ports including a first port connected to a first node and a second port connected to a second node;

a network information memory for storing node information of the first and second nodes;

a packet determiner connected to the first and second ports and the network information memory for determining with the node information an addressee of data received by the first port from the first node; and an interface control circuit connected to the packet determiner to temporarily disconnect the second node from the second port when the data is not addressed to the second node, wherein the data transmission controller is one of a plurality of data transmission controllers provided in each of a plurality of nodes configuring a network system, each of the nodes transmitting to other nodes a packet including a physical node number when the network system undergoes a bus reset, and wherein the network information memory stores the physical node number of each node as the node information.

10. A data transmission controller incorporated in a first node for enabling data received by a first port from a second node to be transmitted by a second port to a third node, wherein the data includes packet information containing a data origination address and a data destination address, the data transmission controller comprising:

a first interface connected to the first port;

a second interface connected to the second port;

a network information memory for storing first address information of the first node, second address information of the second node, and third address information of the third node;

a packet determiner connected to the first and second interfaces for comparing the data destination address with the second and third address information to determine an addressee of the received data; and an interface control circuit connected to the first and second interfaces, the packet determiner, and the network information memory for controlling the first and second interfaces, wherein the interface control circuit processes the received data when the received data is addressed to the first node, transmits the received data to the third node from the second port when the received data is addressed to a downstream node including the third node, and controls the second interface when the received data is not addressed to a downstream node including the third node to idle the second port and disconnect the second port from the third node to form a first sub-network system, which includes the third node and does not include the first node, and a second sub-network system, which includes the first node, to stop data transmission by the second port to the third node, and to permit independent data transmission in each of the first and second sub-network systems.

11. The data transmission controller according to claim 10, wherein the first node and the second node configure the second sub-network system.

12. The data transmission controller according to claim 11, wherein the interface control circuit idles the first and second ports when data transmission in the first and second sub-network systems is completed.

13. A method for controlling data transmission in a network system configured by a plurality of nodes including a first node, a second node, and a third node, wherein the first node has a plurality of ports including a first port connected to the second node and a second port connected to the third node, and wherein each node has address information, the method comprising the steps of:

when the first node receives data, the received data including the address information of the node to which the received data is addressed, comparing at the first node the address information stored in the first node with the address information included in the received data;

temporarily disconnecting the third node from the second port when the received data is not addressed to a downstream node including the third node to divide the network system into a first sub-network system, which includes the third node and does not include the first node, and a second sub-network system including the first and second nodes; and permitting data transmission within each of the sub-network systems.

14. A method for controlling data transmission in a network system configured by a plurality of nodes including a first node, a second node, and a third node, wherein the first node has a plurality of ports including a first port connected to the second node and a second port connected to the third node, and wherein each node has address information, the method comprising the steps of:

when the first node receives data, the received data including the address information of the node to which the received data is addressed, comparing at the first node the address information stored in the first node with the address information included in the received data;

temporarily disconnecting the third node from the first node to form a first sub-network system, which includes the third node and does not include the first node, and a second sub-network system, which includes the first node, when the received data is addressed to the first node; and permitting data transmission within each of the sub-network systems.

\* \* \* \* \*